3,679,431
WORT PRODUCTION
David Henry Clayton, 161 Manthorpe Road, Grantham, England, and John Karkalas, Wilhelm Becksvej 93, 8000 Aarhus C, Denmark
Filed May 13, 1969, Ser. No. 824,048
Claims priority, application Great Britain, May 15, 1968, 23,028/68; Apr. 22, 1969, 20,409/69
Int. Cl. C12c 7/00
U.S. Cl. 99—52      14 Claims

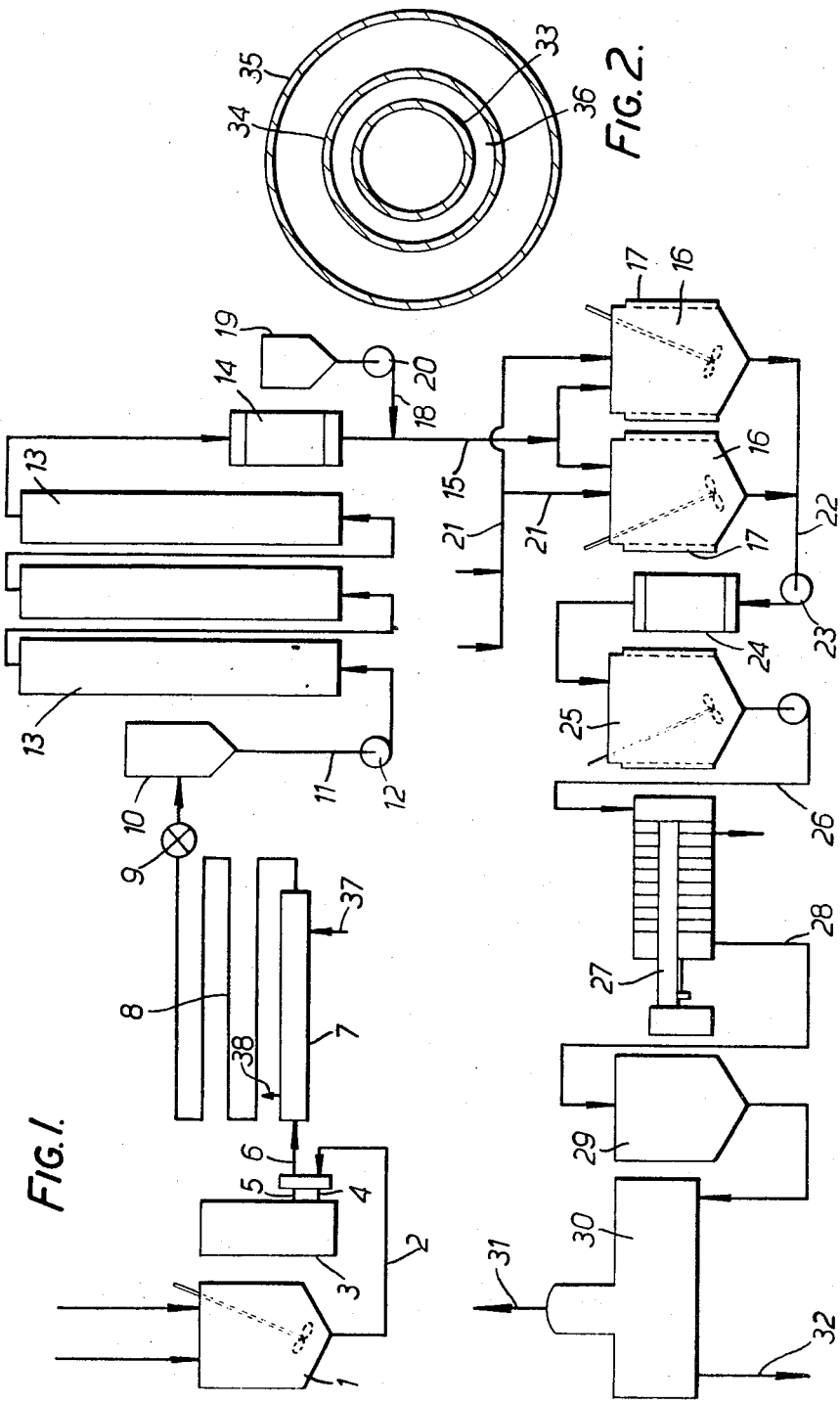

ABSTRACT OF THE DISCLOSURE

A method of producing wort by the action on a mash of starch liquefying enzymes, saccharifying enzymes and proteolytic enzymes includes subjection of the mash to hydrodynamic conditions such that a thixotropic reduction of viscosity is obtained to facilitate the action of the starch liquefying enzymes.

PRIOR APPLICATION

Great Britain May 15, 1968, application No. 23,028/68.
Great Britain Apr. 22, 1969, application No. 20,409/69.

This invention is concerned with improvements in or relating to wort production.

Wort contains in addition to fermentable carbohydrates, soluble nitrogeneous compounds. Barley malt is the traditional raw material for the production of wort since it provides a source of carbohydrates and nitrogen compounds and in addition provides the enzymes capable of degrading the carbohydrates and nitrogen compounds to the soluble components of wort.

Malt is manufactured from e.g. barley by the process of malting. This consists of first germinating and then drying barley grain under controlled conditions.

The manufacture of malt is expensive because (1) large capital investments are necessary for the malting machinery, (2) a skilled labour force is required to operate the malting machines, (3) malt can only be made successfully from the higher qualities of barley which are expensive and (4) during the malting process a physical loss in dry matter occurs; this is known as "the malting loss."

It is an object of the invention to provide an improved method of producing a wort in which the use of barley malt is reduced or virtually eliminated.

We have found that wort may be produced by treating an aqueous slurry of starch- and protein-containing plant material for example unmalted cereal grain e.g. finely ground barley, wheat or maize with a commercial starch liquefying enzyme to liquefy starch, subjecting the slurry to hydrodynamic conditions such that a substantial thixotropic reduction of viscosity is produced by shearing forces in the slurry to facilitate the action of the starch liquefying enzyme prior to any substantial reduction of viscosity resulting from the enzymatic liquefication, converting starch to sugar by treatment with a saccharifying enzyme, and converting protein to soluble nitrogen containing compounds by treatment with a proteolytic enzyme.

It appears that said hydrodynamic conditions result in the formation of a homogeneous mass very suitable for the action of the starch liqefying enzyme.

Examples of starch- and protein-containing plant materials other than cerals include roots, fungi material and by-products of processes to which cereals have been subjected.

Examples of suitable materials include tapioca and rice, as well as wheat, barley and maize.

In cases where nitrogen content of the material is low it may be necessary to add minor amounts of soluble protein to the wort in order to make a wort suitable for the production of beer.

A commercial enzyme preparation comprises an enzyme which has been extracted and purified industrially. It may be used for example supported on a solid substrate or in the form of a solution.

The invention provides a method of producing wort from an aqueous slurry of starch- and protein-containing plant material comprising the steps of liquefying starch by treating the slurry with a commercial starch liquefying enzyme subjecting the slurry to hydrodynamic conditions such that a substantial thixotropic reduction of viscosity is produced by shearing forces in the slurry to facilitate the action of the starch liquefying enzyme prior to any substantial reduction of viscosity resulting from the enzymatic liquefication converting starch to sugar by treatment with a saccharifying enzyme and converting protein to soluble nitrogen-containing compounds by treatment with a proteolytic enzyme.

The invention also provides wort when produced by a method as set out in the last preceding paragraph.

The invention also provides a process for brewing beer including such a method.

The invention also provides beer when produced by such a process.

The invention also provides a process of producing a concentrated wort syrup by concentrating wort produced by such a method.

The invention also provides a concentrated wort syrup when produced by such a process.

Preferably the cereal grain is ground to a particle size to all pass through a 20–40 British Standard Mesh and its concentration in the slurry is between 10 and 30 grams per 100 cc. more preferably 25 grams per 100 cc. Preferably the hardness of the water of the slurry is between 200 and 300 equivalent parts by weight of $CaCO_3$ per million parts by weight of water; if the hardness is less than 200 equivalent parts then calcium chloride or other calcium salts may be added to increase the hardness. Calcium ions have been found to increase the resistance of the enzymes to deactivation by heat.

As the commercial starch liquefying enzyme it is preferred to use bacterial $\alpha$-amylase which has optimum effect at about 86° C.; the bacterial $\alpha$-amylase may, for example, be derived from the following well known sources:

Bacillus subtilis
Bacillus cereus
Bacillus polymyxa
Bacillus megaterium
Bacillus amyloliquefaciens Preferably the slurry is treated with the starch liquefying enzyme at a temperature between 60° C. and 100° C. for example between 80° C. and 90° C., more preferably about 86° C.; preferably the pH is between 6 and 8, more preferably about 6.5. By treating the slurried material with a liquefaction enzyme at the specified temperature a product may be formed which does not gelatinize on cooling. When heating the slurried mixture, gelatinization of the starch takes place and in the absence of the thixotropic reduction the viscosity would be strongly increased. However, at the same time the liquefaction enzymes start to degrade the starch thus reducing the viscosity of the medium. Thus, after some time the starch has been converted to such a degree that the medium does not gelatinize when cooled.

The commercial proteolytic enzyme may be fungal or bacterial; bacterial protease is preferred; bacterial protease may, for example, be derived from the following well known sources:

Bacillus subtilis
Bacillus cereus
Bacillus polymyxa
Bacillus megaterium
Bacillus amyloliquefaciens fungal protease may, for example be derived from the following well known sources:

Rhizopus sp
Aspergillus flavus oryzae
Aspergillus oryzae
Aspergillus tamarii
Aspergillus niger The saccharifying enzyme is for example β-amylase added in the form of ground malt. Commercial β-amylase may for example be derived from soya. The malt preferably has a diastatic activity between 40° and 100° Lintner. For example between 2% and 10% malt by weight of cereal grain (as is) is used. Other saccharifying enzymes may be used e.g. amylglucosidase or fungal amylase.

Preferably the medium is treated with the proteolytic enzyme and the saccharifying enzyme simultaneously at a temperature between 25° C. and 60° C., more preferably about 55° C. the medium being cooled to the required temperature following the liquefaction step; preferably the pH is between 4.5 and 6.5, more preferably 5.5. Proteolytic enzymes show optimum effect at a temperature of between 25° C. and 60° C. and at a pH-value of between 4 and 10. Saccharifying enzymes also have optimum effect at 25–60° C. and at a pH-value of 4.6. Thus, by cooling the liquefied product to a temperature within said temperature range and adjusting the pH-value to between 5 and 6 preferably 5.5 an optimum effect of both the proteolytic enzymes and the saccharifying enzymes is obtained.

Following the treatment with proteolytic enzyme and saccharifying enzyme the resultant wort is, for example, filtered and passed directly to normal subsequent processing to produce beer. Alternatively, for example, the wort is filtered and evaporated to a syrup which is stored and subsequently diluted to provide a wort for normal subsequent processing; the wort is preferably filtered without cooling.

If malt is used as a source of the saccharifying enzyme or if starch is used as an enzyme substrate it is preferred to heat the medium treated with proteolytic and saccharifying enzymes to a temperature of between 70° C. and 80° C. e.g. about 75° C. before further processing. In this manner the non-gelatinized starch contained in said malt is converted into soluble carbohydrates and the yield of soluble carbohydrates in the wort produced is consequently increased. Furthermore, the filtration of the mash is considerably improved.

Preferably the syrup contains between 75% and 82% by weight total solids, more preferably about 80%.

There now follows a description to be read with reference to the accompanying drawings, of apparatus for carrying out a method embodying the invention. This description is given by way of example of the invention only and not by way of limitation thereof.

In the accompanying drawings:

FIG. 1 shows a flow diagram of the apparatus; and
FIG. 2 shows a cross-section through a heat exchanger forming part of the apparatus.

In the drawings, 1 indicates a vessel in which commercial bacterial α-amylase is mixed with a slurry of finely ground unmalted barley; the barley may be wet ground or ground in a dry condition. From the bottom of the vessel 1, a pipe 2 leads to an inlet 4 of a diaphragm pump 3 of the type in which the diaphragm is hydraulically operated by means of a reciprocating piston. An outlet 5 of the diaphragm pump 4 is connected through a pipe 6 with a heat exchanger 7, and to an outlet end of the heat exchanger 7 there is connected conduit means comprising a tubular reactor 8. A valve 9 is provided in a pipe connecting the tubular reactor 8 with a cyclone collector 10. The bottom of said cyclone collector 10 is connected, through a pipe 11 in which a pump 12 is provided, to a series of continuous reactor vessels 13. The last reactor vessel in said series is connected with an inlet end of a cooler 14. A pipe 15 is connected to an outlet end of said cooler 14 and by means of a valve (not shown) material passing through the pipe 15 can be passed alternately to one of two saccharification tanks 16 which are provided with mixers and with jackets 17 for circulation of a liquid to maintain a constant temperature. The pipe 15 has a branch pipe 18 which is connected with an acid reservoir 19 through a pump 20.

Pipes 21 are provided to introduce malt or other saccharifying enzymes and proteinase into the saccharifaction tank 16.

A pipe 22 in which a pump 23 is provided connects the saccharification tanks 16 with a heater 24. An outlet of said heater 24 is connected with a tank 25 provided with a mixer. A pipe 26 leads from the bottom of the tank 26 to a plate and frame filter press 27 from which filtrate may be passed to a filtrate tank 29 through a pipe 28. The filtrate tank 29 is connected with an evaporator 30 having a vapour outlet 31 and a concentrate outlet 32.

As will be seen from FIG. 2, the heat exchanger 7 comprises three tubes 33, 34 and 35 arranged one within the other. An annular passage 36 for the medium to be treated is formed between the tubes 33 and 34. Steam is supplied to the interior of the innermost tube 33 and to a heating jacket formed between the tubes 34 and 35. The steam is supplied at 37 in FIG. 1, and waste steam is taken off at 38.

The slurry from the vessel 1, which slurry is adjusted to a pH-value of about 6.5, is pumped by means of the diaphragm pump 3 through the heat exchanger 7, and the tubular reactor 8 in a continuous rythmically pulsating flow movement.

During the passage of the medium through the heat exchanger 7, it is gradually heated to the selected liquefiying temperature, which as above explained is preferably about 86° C., and the medium is maintained at this temperature while passing through the tubular reactor 8. The length of the tubular reactor 8 is such that when the medium has passed through the tubular reactor 8, the liquefying process has proceeded to a point where the medium is no longer gelatinizable by cooling.

The medium thus treated is collected in the cyclone collector 10 and is subsequently pumped through the continuous reactor vessel 13 which are maintained at a temperature of about 86° C. The reactor vessels 13 are constructed in such a manner that no back mixing takes place. The number of reactor vessels is not critical, thus one or several reactor vessels may be used. The total residence time of the medium passing through the reactor vessels is between 2 and 5 hours, depending on the amount of liquefying enzyme added.

When the medium leaves the reactor vessels 13 the Dextrose Equivalent value is for example about 15%.

In the cooler 14 the liquefied medium is cooled to a temperature of about 55° C. and subsequently the pH-value is adjusted to about 5.5 by introducing acid such as hydrochloric acid from the reservoir 19. The acidified medium is then passed to one of the tanks 16.

Malt and proteinase are introduced into the tanks through the appropriate pipe 21 and the liquefied medium which is maintained at a temperature of about 55° C. is now subjected to the influence of the saccharifying enzymes and the proteinase.

The malt which is introduced into the tank 16 contains some non-gelatinized starch and in order to convert said starch into soluble carbohydrates the medium is heated to a temperature of about 75° C. in the heater 24, and then passed to the tank 25 in which it is maintained at a temperature of 75° C. for a time sufficient to convert the starch introduced in the form of malt to soluble carbohydrates.

The medium is then pumped through the filter press 27 in which the insoluble materials are separated in the form of a filter cake. The filtrate passes through the pipe 28 to the filtrate tank 29 and from this tank to the evaporator 30 in which it is concentrated to a total solids content of about 80%.

Referring to FIG. 2, the width of the passage 36; i.e. the distance between the walls of the tubes 33, 34 and the pressure and velocity of the medium are so selected that the medium, while flowing through the passage 36, will be subjected to considerable inner shearing forces producing a substantial thixotropic reduction of viscosity. The viscosity of the medium entering the tubular reactor 8 is reduced as a result of the enzymatic liquefaction conditions in the passage 36 and in the reactor 8.

The passage 36 is, for example, about 9 mm. wide. The length of the passage 36 is, for example, between 15 and 30 metres and the length of the tubular reactor 8 is, for example, between 180 and 240 metres.

The pressure of the medium in the passage 36 is, for example, between 15 and 35 atm.

The total residence time of the medium in the heat exchanger 7 and the tubular reactor 8 is preferably between 5 and 20 minutes, more preferably about 10 minutes. Thus the velocity in the passage 36 is between 6 metres per minute and 0.75 metre per minute.

The residence time for the medium in the tank 16 depends on the quantity of malt used and may vary for example, between 2 and 16 hours; for example, if 2% malt is used the residence time may be between 7 and 16 hours and if 10% malt is used the residence time may be 5 hours or less.

The medium from the reactor 20 is readily filterable and this obviates the use of complicated centrifuging equipment, and filter aid substances.

It appears that when barley is used a wort is produced which has substantially the same nitrogen content and carbohydrate spectrum as wort produced conventionally for beer brewing and is relatively light in colour. The wort may be used directly without being made into a syrup as a full replacement for a conventionally produced wort thus economising and simplifying plant or alternatively the syrup may be used to increase the throughput of a conventional process at peak times; in this case the syrup is diluted and added to conventionally produced wort.

Also it appears that the quality of the barley is not critical.

EXAMPLE I 48 kg. barley flour (43 kg. dry substance) were mixed with 120 kg. of water. The pH-value was adjusted to 6.5 with $Na_2CO_3$ and 66 grams $CaCl_2, 2H_2O$ (calcium ions were found to enhance the stability of the α-amylase at high temperature) were added followed by 430 grams of commercial α-amylase preparation (NERVANASE 10.3 X marketed by ABM Industrial Products Limited of England).

The resulting slurry was pumped through the heat exchanger 7, the reactor 8 and the vessels 13 of the apparatus described with reference to the drawings at a rate of 128 litres per hour under conditions described with reference to the drawings. The total liquefaction time was 4 hours 43 minutes at 86° C.

The temperature of the product was lowered to 55° C. in the cooler 14 and the pH adjusted to 5.5 by means of HCl. Then 800 grams malt and 400 grams commercial proteinase (38.7 XS marketed by said ABM Industrial Products Limited) were added. After 16 hours the product was ready for filtration in the filter press 27.

The filtrate had a clear amber colour and a pleasant flavour. It was concentrated to about 80% by weight total solids in the evaporator 30. The resulting wort concentrate is stable for long periods of time and can be diluted to any desired concentration before fermentation. The composition of the wort is given in Table I following these examples. The wort composition is in good agreement with the composition of wort prepared by the traditional method where malt is the starting material, cf. Table II.

EXAMPLE II 48 kg. barley flour (43 kg. dry substance) were mixed with 120 kg. water. The pH-value was adjusted to 6.5 by means of $Na_2CO_3$ and 79 grams calcium acetate monohydrate were added followed by 215 grams commercial α-amylase preparation (NERVANASE 10.3 X).

The resulting slurry was pumped through the heat exchanger 7, the reactor 8, and the vessels 13 at a rate of 128 litres per hour. The total liquefaction time was 3 hours 2 minutes at 86° C.

The temperature of the product was lowered to 55° C. in the cooler 14 and the pH-value adjusted to 5.5 by means of HCl.

4.8 kg. of malt and 215 grams of proteinase (38.7 XS) were added. After 5 hours the product was ready for filtration.

The resulting wort had the composition shown in Table I.

The filtration and concentration of the wort were performed as described in Example I.

EXAMPLE III 78 kg. maize four (68 kg. dry substance) were mixed with 195 kg. of water. The pH-value was adjusted to 6.5 by means of $Na_2CO_3$ and 398 grams of $CaCl_2, 6H_2O$ were added followed by 680 grams of a commercial α-amplase preparation (NERVANASE 10.3 X).

The resulting slurry was pumped through the heat exchanger 7, the reactor 8 and the vessels 13 at a rate of 120 litres per hour. The total liquefaction time was 5 hours at 85° C.

The temperature was then lowered to 55° C. in the cooler 14 and the pH-value adjusted to 5.5 by means of HCl.

Then, 1300 grams of malt and 680 grams of proteinase (38.7 XS) were added. After 15 hours the product was ready for filtration.

The wort composition is given in the Table I.

The filtration and concentration of the wort were performed as described in Example I.

Wort produced according to the examples has been used for the preparation of beer. In all cases, a panel of experts considered the beer very satisfactory with respect to flavour, appearance and composition. In fact the beer prepared from wort produced as described above is virtually indistinguishable from conventionally produced beer.

TABLE I

|  | Example I | Example II | Example III |
|---|---|---|---|
| Raw material | Barley flour | Barley flour | Maize flour |
| Liquifying enzyme concentration | 1% by weitht of barley (dry basis). | 0.5% by weight of barley (dry basis). | 1% by weight of maize (dry basis) |
| Proteinase concentration | 1% (dry basis) | 0.5% (dry basis) | 1% (dry basis). |
| Malt concentration | 2% (dry basis) | 10% (dry basis) | 2% (dry basis). |
| Liquifaction, time | 4 hours 43 minutes | 3 hours 0.2 minutes | 5 hours 00 minutes. |
| Saccharification, time | 16 hours | 5 hours | 15 hours. |
| Dextrose equivalent plus (DE) after liquefaction. | 18.5 percent | 12.6 percent | 29.0 percent. |
| DE after saccharification | 43.9 percent | 46.6 percent | 45.7 percent. |
| Composition of wort: |  |  |  |
| Protein (N×6.25) | 4.3% (dry basis) | 3.8% (dry basis) | 1.4% (dry basis). |
| Amino nitrogen (alpha) | 0.13% (dry basis) | 0.12% (dry basis) |  |
| Ash | 2.9% (dry basis) | 1.9% (dry basis) | 2.7%. |

¹ If the wort is to be used for the preparation of beer minor amounts of soluble protein can be added.

The saccharide spectrum of the wort prepared as described in Examples I, II and III appears from the following Table II.

TABLE II
[Percent by weight]

| Saccharide distribution | Example I | Example II | Example III |
|---|---|---|---|
| Dextrose | 2.7 | 6.6 | 10.1 |
| Maltose | 48.2 | 52.0 | 46.2 |
| Trioses and tetraoses | 23.5 | 20.5 | ¹8.1 |
| Higher saccharides | 25.6 | 20.9 | 35.3 |

¹ Trioses only.

We claim:
1. A method of producing wort from an unmalted cereal grain comprising the steps of
providing a slurry of the grain in water,
liquefying starch by treating the slurry with a commerical starch liquefying enzyme at a temperature between 60° C. and 100° C.,
subjecting the slurry to flow through a passage whereby a substantial thixotropic reduction of viscosity is produced by shearing forces in the slurry to facilitate the action of the starch liquefying enzyme prior to any substantial reduction of viscosity resulting from the enzymatic liquefaction,
cooling the product thus obtained to a temperature between 25° C. and 60° C., and
adding a saccharifying enzyme and a proteolytic enzyme at said temperature to convert starch into sugar and protein into soluble nitrogen containing compounds.

2. A method according to claim 1, wherein after viscosity has been reduced as a result of the enzymatic liquefaction, the slurry is conducted through conduit means of a length sufficient to increase liquefaction to a point where the slurry is no longer gelatinisable by cooling.

3. A method according to claim 1 wherein the hardness of the water of the slurry is between 200 and 300 equivalent parts by weight of CaCO₃ per million parts by weight of water.

4. A method according to claim 1 wherein the cereal grain comprises barley.

5. A method according to claim 1 wherein said flow through a passage is at a pressure between 15 and 35 atmospheres, and a flow velocity of the slurry between 6 metres per minute and 0.75 metre per minute.

6. A method according to claim 1 wherein the cooled product treated with proteolytic and saccharifying enzymes is subsequently heated to a temperature between 70° C. and 80° C. to convert non-gelatinised starch into soluble carbohydrate.

7. A process of producing a concentrated wort syrup by concentrating wort produced by a method according to claim 1.

8. A method according to claim 1 wherein said flow is a pulsating flow.

9. A method according to claim 1, wherein said passage is annular, the slurry passing through said passage while being heated to said temperature between 60° C. and 100° C.

10. A method according to claim 1 wherein said wort is fermented to produce beer.

11. A method of producing wort from an unmalted cereal grain comprising the steps of
providing a slurry of the grain in water having a hardness between 200 and 300 equivalent parts by weight of CaCO₃ per million parts by weight of water
liquefying starch by treating the slurry with a commercial starch liquefying enzyme at a temperature between 60° C. and 100° C.,
subjecting the slurry to flow at a flow velocity between 6 meters per minute and 0.75 meter per minute under a pressure between 15 and 35 atmospheres whereby a substantial thixotropic reduction of viscosity is produced by shearing forces in the slurry to facilitate the action of the starch liquefying enzyme prior to any substantial reduction of viscosity resulting from the enzymatic liquefaction;
converting starch to sugar by treatment with a saccharifying enzyme at a temperature between 25° C. and 60° C., and
converting protein to soluble nitrogen-containing compounds by treatment with a proteolytic enzyme at a temperature between 25° C. and 60° C.

12. A method according to claim 11, wherein the slurry after being subjected to said flow is treated simultaneously with the proteolytic enzyme and the saccharifying enzyme at a temperature between 25° C. and 60° C.

13. A method according to claim 11 wherein said flow is a pulsating flow.

14. A method according to claim 11, wherein said flow is a pulsating flow through a passage of elongated cross-section and the slurry is subjected to the flow while being heated to said temperature between 60° C. and 100° C.

References Cited
UNITED STATES PATENTS

| 2,790,718 | 4/1957 | Nugey | 99—52 X |
| 2,951,762 | 9/1960 | Nugey | 99—51 |
| 2,967,804 | 1/1961 | Kerr | 195—11 |
| 3,081,172 | 3/1963 | Dennis et al. | 99—51 |
| 3,308,037 | 3/1967 | Goos et al. | 195—31 R |
| 3,371,018 | 2/1968 | Ewing et al. | 195—31 R |

FOREIGN PATENTS

| 501,672 | 4/1954 | Canada | 99—51 |

JOSEPH M. GOLIAN, Primary Examiner

U.S. Cl. X.R.
195—31

UNITED STATES PATENT OFFICE
CERTIFICATE OF CORRECTION

Patent No. 3,679,431        Dated July 25, 1972

Inventor(s) David Henry Clayton and John Karkalas

It is certified that error appears in the above-identified patent and that said Letters Patent are hereby corrected as shown below:

In Column 1, Line 5, after "Denmark", insert - - assignors to A.B.M. Industrial Products Limited, Woodley, Stockport, Cheshire, England, and Karl Kristian Kobs Kroyer, Aarhus - Viby, Denmark - -

Signed and sealed this 20th day of February 1973.

(SEAL)
Attest:

EDWARD M. FLETCHER, JR.        ROBERT GOTTSCHALK
Attesting Officer               Commissioner of Patents